US012745230B2

(12) United States Patent
He et al.

(10) Patent No.: US 12,745,230 B2
(45) Date of Patent: Sep. 22, 2026

(54) CARRIER AGGREGATION USING COMPONENT CARRIER GROUPS

(71) Applicant: ZTE CORPORATION, Shenzhen (CN)

(72) Inventors: Zhen He, Shenzhen (CN); Bo Gao, Shenzhen (CN); Ke Yao, Shenzhen (CN); Shujuan Zhang, Shenzhen (CN); Chuangxin Jiang, Shenzhen (CN); Yu Pan, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 216 days.

(21) Appl. No.: 17/974,329

(22) Filed: Oct. 26, 2022

(65) Prior Publication Data

US 2023/0113530 A1 Apr. 13, 2023

Related U.S. Application Data

(63) Continuation of application No. PCT/CN2020/089095, filed on May 8, 2020.

(51) Int. Cl.
*H04W 72/044* (2023.01)
*H04L 5/00* (2006.01)
*H04W 72/231* (2023.01)

(52) U.S. Cl.
CPC ........... *H04W 72/046* (2013.01); *H04L 5/001* (2013.01); *H04L 5/0023* (2013.01); *H04L 5/0091* (2013.01); *H04W 72/231* (2023.01); *H04L 5/0048* (2013.01)

(58) Field of Classification Search
CPC .... H04W 72/46; H04W 72/231; H04L 5/001; H04L 5/0023; H04L 5/0091
See application file for complete search history.

(56) References Cited

U.S. PATENT DOCUMENTS

| | | | | |
|---|---|---|---|---|
| 2014/0140293 | A1 | 5/2014 | Sharma et al. | |
| 2015/0230206 | A1* | 8/2015 | Tabet | H04W 72/02 370/329 |
| 2018/0288755 | A1 | 10/2018 | Liu et al. | |
| 2019/0312621 | A1* | 10/2019 | Nam | H04W 72/23 |
| 2020/0052765 | A1 | 2/2020 | Islam et al. | |
| 2020/0267730 | A1* | 8/2020 | Kim | H04W 72/0453 |

(Continued)

FOREIGN PATENT DOCUMENTS

| | | |
|---|---|---|
| CN | 110798894 A | 2/2020 |
| CN | 110913419 A | 3/2020 |

(Continued)

OTHER PUBLICATIONS

Guan et al, Chinese Application 202010087025.5, Feb. 11, 2020.*

(Continued)

*Primary Examiner* — Kevin C. Harper
(74) *Attorney, Agent, or Firm* — Foley & Lardner LLP

(57) ABSTRACT

Presented are systems and methods for configuring component carrier groups. A wireless communication device may determine a first reference signal associated with a second reference signal. The wireless communication device may determine information of a target signal in a first component carrier (CC) according to the first reference signal. The second reference signal may be in a second CC in an activated beam state.

8 Claims, 10 Drawing Sheets

(56) References Cited

U.S. PATENT DOCUMENTS

2022/0173848 A1* 6/2022 Guan .................. H04B 7/0695
2024/0260049 A1 8/2024 Yang et al.

FOREIGN PATENT DOCUMENTS

| | | | | |
|---|---|---|---|---|
| CN | 111106915 | A | 5/2020 | |
| EP | 3 735 016 | A1 | 11/2020 | |
| EP | 4 040 891 | A1 | 8/2022 | |
| TW | 201937873 | A | 9/2019 | |
| WO | WO-2018/075205 | A1 | 4/2018 | |
| WO | WO-2019/130858 | A1 | 7/2019 | |
| WO | WO-2019/203711 | A1 | 10/2019 | |
| WO | WO-2021027750 | A1 * | 2/2021 | ........... H04B 7/0617 |

OTHER PUBLICATIONS

English translation of WO 2021027750 A1.*
Extended European Search Report for EP Appl. No. 20895452.9, dated May 15, 2023 (11 pages).
First Office Action for IN Appl. No. 202227036535, dated Jan. 3, 2023 (5 pages).
(Moderator) Apple., "Feature Lead Summary #2 on L1-SINR and SCell BFR" 3GPP TSG RAN WG1 #100b, R1-2002340, Apr. 30, 2020, e-Meeting (18 pages).
Apple Inc., "On Further MIMO Enhancement" 3GPP TSG RAN WG1 #100b, R1-2002342, Apr. 30, 2020, e-Meeting (8 pages).
Apple Inc., "Remaining Issues on Multi-beam operation" 3GPP TSG RAN WG1 #100-e, R1-2000860, Mar. 6, 2020, e-Meeting (12 pages).
Apple Inc., "Remaining Issues on Multi-beam operation" 3GPP TSG RAN WG1 #100b, R1-2002338, Apr. 30, 2020, e-Meeting (10 pages).
Huawei et al., "Discussion on other UE performance requirement for NR eMIMO" 3GPP TSG-RAN WG4 Meeting #94-e, R4-2001467, Mar. 6, 2020, e-Meeting (4 pages).
Huawei et al.: "Beam measurement and reporting" 3GPP TSG RAN WG1 Meeting NR#3; R1-1715467; Sep. 21, 2017; Nagoya, Japan (9 pages).
International Search Report and Written Opinion for PCT Appl. No PCT/CN2020/089095, mailed Jan. 28, 2021 (8 pages).
LG Electronics, "Revised Summary on Rel-16 Multi-Beam 1 maintenance" 3GPP TSG RAN WG1 #100, R1-2001161, Mar. 6, 2020, e-Meeting (3 pages).
LG Electronics, "Summary on Rel-16 Multi-Beam 1 maintenance" 3GPP TSG RAN WG1 #100, R1-2000681, Mar. 6, 2020, e-Meeting (3 pages).
Oppo, "Remaining Issues on Multi-beam Operation Enhancement" 3GPP TSG RAN WG1 #100, R1-2000458, Mar. 6, 2020, e-Meeting (8 pages).
Oppo, "Remaining Issues on Multi-beam Operation Enhancement" 3GPP TSG RAN WG1 #100bis, R1-2001727, Apr. 30, 2020, e-Meeting (11 pages).
OPPO: "Discussion on Remaining issues of Beam Management" 3GPP TSG RAN WG1 Meeting 90bis; R1-1718054; Oct. 13, 2017; Prague, CZ (7 pages).
Qualcomm Incorporated, "Discussion on eMIMO UE features" 3GPP TSG RAN WG1 #100bis, R1-2002567, Apr. 30, 2020, e-Meeting (19 pages).
Qualcomm Incorporated., "DL/UL beam indication with reduced latency and overhead" 3GPP TSG-RAN WG4 Meeting #94, R4-2002122, Mar. 6, 2020, e-Meeting (3 pages).
Samsung, "WF on NR eMIMO RRM requirements" 3GPP TSG-RAN WG4 Meeting #94-e, R4-2002182, Mar. 26, 2020, e-Meeting (7 pages).
Communication pursuant to Article 94(3) EPC for EP Appl. No. 20895452.9, dated Oct. 14, 2024 (10 pages).
Communication pursuant to Article 94(3) EPC for EP App. No. 20895452.9 dated Apr. 17, 2025 (9 pages).
Communication pursuant to Article 94(3) EPC for EP Appl. No. 20895452.9, dated Nov. 21, 2025 (10 pages).
Final Rejection for KR Appl. No. 10-2022-7022146, dated Nov. 21, 2025 (with English translation, 6 pages).
First Office Action for CN Appl. No. 202311780882.3, dated May 21, 2026 (with English translation, 14 pages).

* cited by examiner

CARRIER AGGREGATION USING COMPONENT CARRIER GROUPS

CROSS-REFERENCE TO RELATED APPLICATION

This application claims the benefit of priority under 35 U.S.C. § 120 as a continuation of PCT Patent Application No. PCT/CN2020/089095, filed on May 8, 2020, the disclosure of which is incorporated herein by reference in its entirety.

TECHNICAL FIELD

The disclosure relates generally to wireless communications, including but not limited to systems and methods for configuring component carrier groups.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may determine a first reference signal associated with a second reference signal included in a beam state. The wireless communication device may determine information of a target signal in a first component carrier (CC) according to the first reference signal.

In some embodiments, the wireless communication device may determine that the beam state is applicable to the target signal in the first CC or in a CC list including the first CC based on a first command. In some embodiments, the wireless communication device may be provided by a higher layer configuration with a beam state list. In some embodiments, the wireless communication device may determine the beam state from the beam state list based on a second command.

In some embodiments, the first CC and a second CC may belong to a same CC list or belong to a first CC list and a second CC list, respectively. In some embodiments, the beam state may be configured in the second CC. In some embodiments, the first CC list may be associated with the second CC list. In some embodiments, the wireless communication device may determine that the first CC list is associated with the second CC list based on a third command. The first command may include at least one of: an identifier of a beam state, an identifier of a first CC list, or an identifier of a second CC list.

In some embodiments, the wireless communication device may determine the second CC based on at least one predefined rule. The at least one predefined rule may include at least one of: the second CC is a primary cell (PCell), the second CC has a highest CC index, the second CC has a lowest CC index, the second CC has a configured beam state list that includes the beam state, or the second CC is provided by a higher layer configuration.

In some embodiments, the wireless communication device may determine a beam state list associated with the second CC or a CC list including the second CC based on receipt of a second higher layer configuration. In some embodiments, the wireless communication device may determine the beam state based on the beam state list.

In some embodiments, the wireless communication device may associate a third reference signal with the second reference signal. In some embodiments, the wireless communication device may associate the first reference signal with the third reference signal. In some embodiments, the second reference signal may be associated with the third reference signal with regards to quasi-co-location (QCL). The first reference signal may be associated with third reference signal with regards to QCL.

In some embodiments, the second reference signal may be associated with the first reference signal with regards to a QCL. In some embodiments, the wireless communication device may utilize a first QCL Type as a second QCL Type. In some embodiments, the first QCL Type is different from the second QCL Type.

In some embodiments, the wireless communication device may determine a resource identifier (ID) based on at least one of a resource ID of the second reference signal or an offset. In some embodiments, the wireless communication device may determine the first reference signal based on the resource ID. The offset may refer to a difference between the resource ID and the resource ID of the second reference signal.

In some embodiments, the wireless communication device may associate a codepoint with at least one of the second reference signal or a set including the second reference signal. In some embodiments, the wireless communication device may map the beam state to the codepoint In some embodiments, the beam state may be applicable to a physical downlink shared channel (PD SCH).

In some embodiments, the wireless communication device may determine a first time slot based on a physical uplink control channel (PUCCH) transmission carrying HARQ-ACK information corresponding to the PDSCH carrying an activation command that activates the beam state or a set of beam states including the beam state. In some embodiments, the wireless communication device may determine a second time slot based on the first time slot and a sub-carrier spacing configuration for the PUCCH. In some embodiments, the wireless communication device may determine the beam state corresponding to a codepoint from a first slot that is after the second time slot.

In some embodiments, the information may include at least one of a beam, a power control parameter, or a port indication. In some embodiments, the target signal may include at least one of a physical downlink control channel (PDCCH), a physical downlink shared channel (PDSCH), a channel state information reference signal (CSI-RS), a physical uplink control channel (PUCCH), a physical uplink shared channel (PUSCH), or a sounding reference signal (SRS).

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
|---|---|
| 3GPP | 3rd Generation Partnership Project |
| 5G | 5th Generation Mobile Networks |
| 5G-AN | 5G Access Network |
| 5G gNB | Next Generation NodeB |
| AF | Application Function |
| CA | Carrier Aggregation |
| CC | Component Carrier |
| C-RS or CRS | Cell Specific Reference Signal |
| CSI | Channel State Information |
| CQI | Channel Quality Indicator |
| CSI-RS | Channel State Information Reference Signal |
| CRI | CSI-RS Resource Indicator |
| DCI | Downlink Control Information |
| DL | Down Link or Downlink |
| DN | Data Network |
| FR | Frequency range |
| HARQ | Hybrid Automatic Repeat Request |
| MAC | Medium Access Control |
| MAC-CE | Medium Access Control (MAC) Control Element (CE) |
| NZP | Non-Zero Power |
| OFDM | Orthogonal Frequency-Division Multiplexing |
| OFDMA | Orthogonal Frequency-Division Multiple Access |
| PC or PCell | Primary Cell |
| PDCCH | Physical Downlink Control Channel |
| PDSCH | Physical Downlink Shared Channel |
| PHY | Physical Layer |
| PUCCH | Physical uplink control channel |
| QCL | Quasi-Co-Location |
| QoS | Quality of Service |
| RE | Resource Element |
| RLC | Radio Link Control |
| RS | Reference Signal |
| RRC | Radio Resource Control |
| SSB | Synchronization Signal Block |
| SRS | Sounding Reference Signal |
| TC | Transmission Configuration |
| TCI | Transmission Configuration Indicator |
| TRS | Tracking Reference Signal |
| UE | User Equipment |
| UL | Up Link or Uplink |

1. Mobile Communication Technology and Environment

Figure 1:
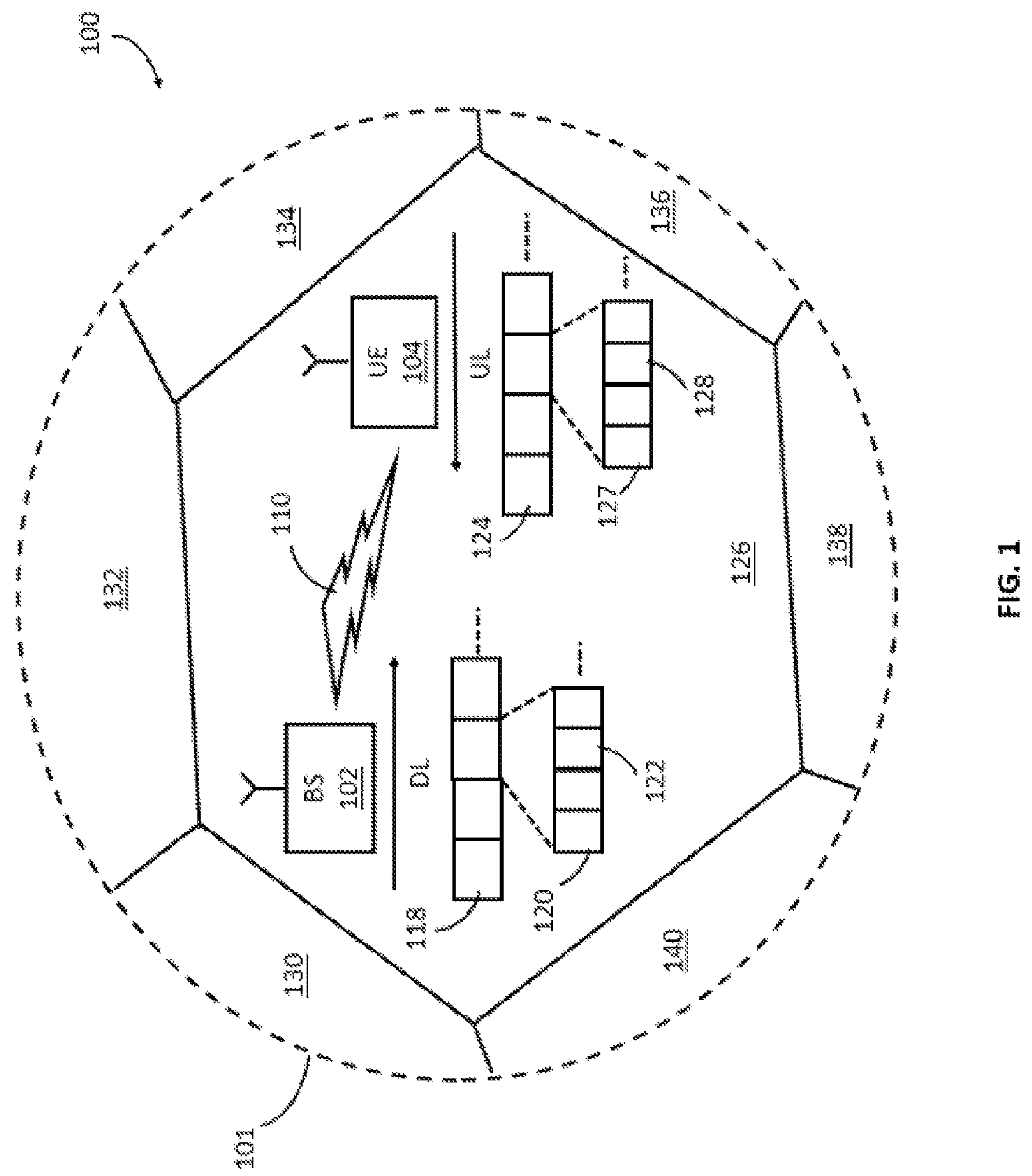
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
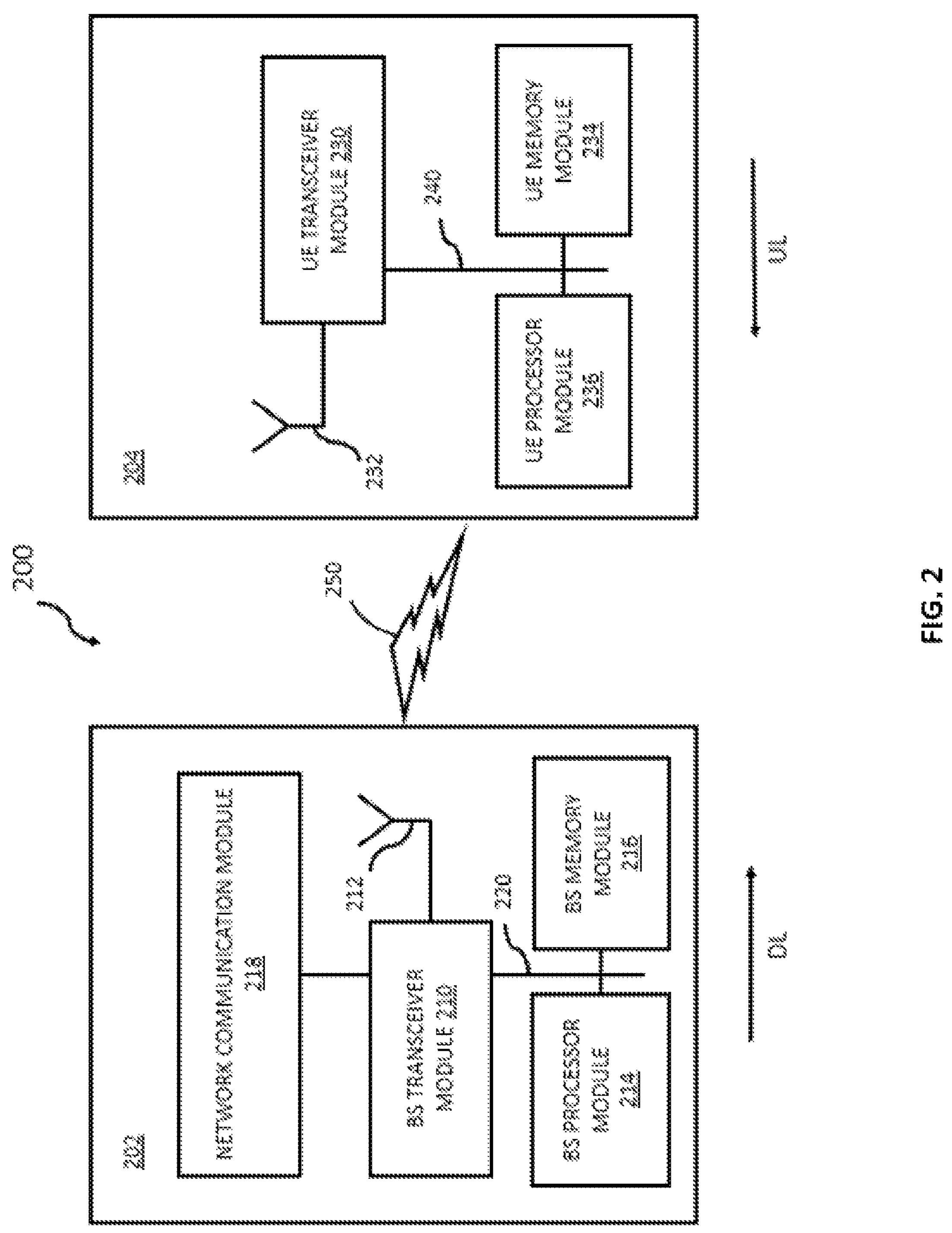
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods of Configuring Component Carrier Groups

Carrier aggregation may be used in order to increase the bandwidth, and thereby increase the bitrate. Each aggregated carrier may be referred to as a component carrier, CC. Carrier aggregation can be used for both FDD and TDD. The CCs can be of different bandwidths.

The beam indication or update mechanism for UL signals of CC group (or CC list) may cause unnecessary overhead of signaling and resource. For example, to update the beam of PDCCH/PDSCH of a CC group, the beam state set (e.g., transmission configuration indication (TCI)-state pool) of all CCs in a CC group may have to be updated. In other words, the beam of signals in a CC can be obtained according to the beam states configured in the local CC, instead of other CCs. To account for these drawbacks, disclosed herein is a validation method for information (e.g., beam) determination across CCs to reduce the overhead of signaling and resource.

In 5G new radio (NR), the analog beam-forming may firstly be introduced into mobile communication for guaranteeing the robustness of high frequency communications. In other approaches, the beam indication and update mechanism may be implemented by configuring or activating a beam state (e.g., TCI-state for DL signals, spatial relation information for UL signals) through RRC signaling, MAC-CE signaling, and downlink control information (DCI). In contrast, under the present disclosure, the UE can be connected to multiple CCs to perform carrier aggregation (CA). When the channel characteristics (e.g., beam) of multiple CCs are the same or similar, these CCs can be used as a CC group.

In other approaches, the beam indication and update mechanism for a CC group (e.g., PDCCH/PDSCH) may be performed as follows. First, a set of TCI-state IDs may be activated by a MAC-CE signaling, Second, the UE may obtain the corresponding TCI-state from the TCI-state pool (or set) configured by a RRC signaling in each CC. Third, the UE can determine the beam of PDCCH/PDSCH in each CC according to the obtained TCI-state in each CC. In other words, the beam of signals in a CC can be obtained according to the beam states configured in the local CC instead of other CCs, which may cause unnecessary overhead of signaling and resource.

On one hand, to update the beam of a CC group containing N CCs, N RRC signaling may be performed to update the TCI-state pool in N CCs. On the other hand, the beam information (e.g., QCL-Type D) in the TCI-state in different CC corresponding to the activated TCI-state ID may be the same, except for some other information (e.g., QCL-Type A). So it may be redundant to configure so many TCI-states for a single CC group. Furthermore, the beam of signals in a CC can be obtained according to the beam states configured in the other CC in the CC group. To account for these, disclosed herein is a validation method for information (e.g., beam) determination across CCs to reduce the overhead of signaling and resource.

In discussing the various features in the present disclosure, "CC" may refer to a component carrier and may also be equivalent to a serving cell, a bandwidth part (BWP), or an active BWP in a serving cell. Furthermore, "beam state" may be equivalent to quasi-co-location (QCL) state, QCL assumption, reference signal (RS), transmission configuration indicator (TCI) state, or spatial relation information (spatialRelationInfo).

"QCL state" or "TCI state" may be comprised of one or more reference RSs (also called as QCL RSs) and their corresponding QCL type parameters (called as QCL Type for short). The QCL type parameters may include at least one of the following aspect or combination: Doppler spread, Doppler shift, delay spread, average delay, average gain, and Spatial parameter. The QCL type may include:

"QCL-Type-A", which may be used to represent the same or quasi-co "Doppler shift, Doppler spread, average delay, delay spread" between targeted "RS or channel" and the one or more reference QCL-Type A-RSsQCL Type-A RSs.

The QCL type may also include "Type-B", which may be used to represent the same or quasi-co "Doppler shift, Doppler spread" between targeted "RS or channel" and the one or more reference QCL Type-B RSs.

The QCL type may also include "QCL-Type-C", which may be used to represent the same or quasi-co "Delay shift, average delay" between targeted "RS or channel" and the one or more reference QCL-Type C-RSsQCL Type-C RSs.

The QCL type may include "QCL-Type-D", which is used to represent the same or quasi-co "Spatial parameter" between targeted "RS or channel" and the one or more reference QCL-Type D-RSsQCL Type-D RSs.

The "QCL reference signal" may include at least one of QCL Type-D RS, QCL Type-A RS, QCL Type-B RS, or QCL Type-C RS. "QCL Type" includes at least one of Type-D, Type-A, Type-B, or Type-C.

"Spatial relation information" may be comprised of one or more reference RSs (also called spatial RS), which may be used to represent the same or quasi-co "spatial relation" between targeted "RS or channel" and the one or more reference RSs. The QCL-Type D may be equivalent to spatial parameter or spatial Rx parameter. The definition of "beam" may be equivalent to QCL assumption, spatial relation or spatial filter The "QCL" or "QCL assumption" includes at least one of the following aspect or combination: Doppler spread, Doppler shift, delay spread, average delay, average gain, and Spatial parameter. "Spatial relation" or "spatial filter" can be either UE-side or gNB-side one, and the spatial filter is also called as spatial domain transmission filter or spatial domain filter. "Signal" can include or may be PDCCH, PDSCH, CSI-RS, PUCCH, PUSCH, SRS, PDCCH CORESET, PDSCH resource, CSI-RS resource, PUCCH resource, PUSCH resource, or SRS resource.

The "codepoint" may occur (or may be represented) as A (where A is a positive integer) bits in downlink information (DCI), and each codepoint corresponds to an activated beam state. For example, "codepoint" can be TCI codepoint, which occurs as 3 bits in DCI, and each TCI codepoint (e.g., 000, 001, . . . , 111) corresponds to an activated beam state applicable to DL signal. The "power control parameter" includes at least one of the following parameter: path-loss RS, closed loop process, and P0. The "path-loss" can be couple loss. The "port indication" may be equivalent to antenna port(s) used to transmit the target signal. For example, "determine a port indication of a PUSCH according to a SRS resource" may refer to (UE) transmit the PUSCH by using the same antenna port(s) as the port(s) in the SRS resource.

A. Associating CCs Using Reference RS

The UE (e.g., UE 104) can determine a first information of a target signal (sometimes referred herein generally as a signal) in a first CC/active BWP (sometimes referred herein generally as CC) according to a first reference RS (also called a first reference signal) associated with a second reference RS in a second CC in an activated/indicated beam state. The first CC may belong to a first CC list, the second CC may belong to a second CC list. In other words, the UE can determine the first reference RS based on the second reference RS. The first information may include one or more of: beam, power control (PC) parameter, and a port indication, among others. The first reference RS or the second reference RD may include one or more of the following: QCL-Type A-RS, QCL-Type B-RS, QCL-Type C-RS, or QCL-Type D-RS, among others, specifically where QCL-Type x-RS is a SSB or CSI-RS.

The CC list may refer to a set of CCs whose beams (e.g., TCIs or spatialRelationInfos) can be updated (e.g., configured, activated, or indicated) simultaneously, "CC list" can also be called "CC group." Furthermore, updating the TCIs simultaneously may involve updating the DL CC list and updating the spatialRelationInfos simultaneously may correspond to updating the UL CC list.

Furthermore, the UE can be indicated by a first command (e.g., RRC signaling, MAC-CE, or DCI) that the beam state is applicable to the target signal in the first CC or a CC list including the first CC. In addition, the first CC list and the second CC list may satisfy at least one of the following relationships:

the first CC list is the same as the second CC list;

the first CC list is associated with the second CC list. In other words, there may be an association between the first CC list and the second CC list.

The UE can determine the association between the first CC list and the second CC list according to a first command (or another third command). The information activated by the first command may include at least one of the following information: a beam state, a first CC list, a second CC list. For example, the first command can be a MAC-CE that may include a beam state ID, a UL CC list ID (referring to the first CC list), and a DL CC list ID (referring to the second CC list).

Figure 3:
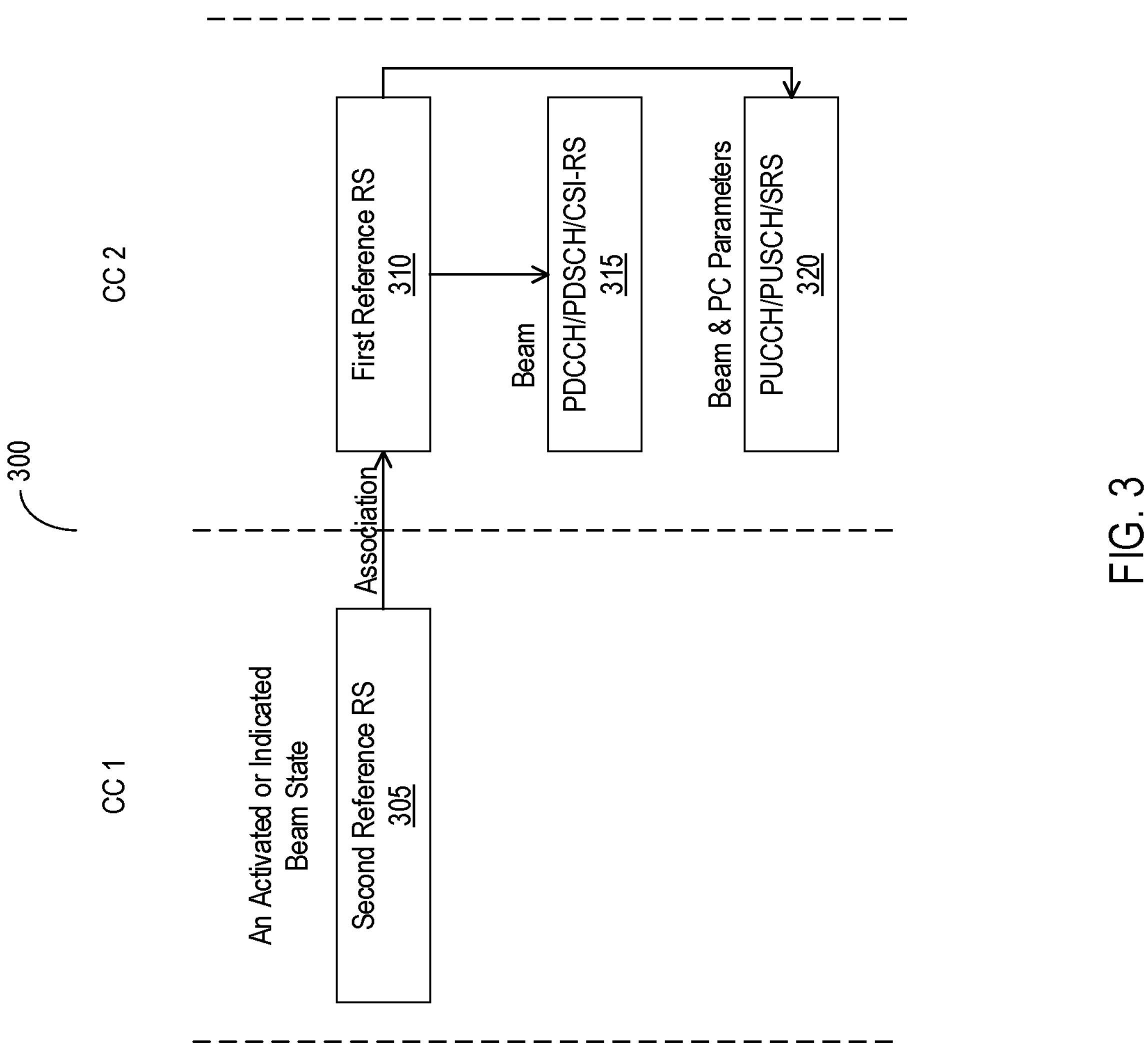
FIG. 3 illustrates a functional band diagram of an example method for associating component carriers using reference signals.

Referring now to FIG. 3, illustrated is a functional band diagram of an example method 300 of associating component carriers using reference signals. As shown, CC1 is the second CC, in other words, the second CC can be called as a reference CC. Both CC1 and CC2 belong a same CC list. The second reference RS can be in an activated/indicated beam state (e.g., TCI-state) configured in CC1 (305). The UE can determine the first reference RS in CC 2 according to the second reference RS in CC1 based on at least the association between the first reference RS and the second reference RS (310). Then, according to the determined first reference RS, the UE (e.g., UE 104) can determine the beam of PDCCH, PDSCH, or CSI-RS in CC2, the beam (315), or the PC parameter of PUCCH, PUSCH, or SRS in CC2 (320).

In some embodiments, the second CC (CC 1) can satisfy at least one of the following feature, in other words, the UE can determine the second CC according to at least one of the following rules:

The second CC is to be a PCell (primary cell);

The second CC is to be configured a beam state list, with the beam state list comprising the activated or indicated beam state;

The second CC is to be the CC that has the lowest CC index;

The second CC is to be the CC that has the highest CC index.

In some embodiments, the UE can determine the second CC according to a first higher layer configuration. The layer configurations may be in accordance with RRC signaling. Specifically, the UE can be provided or configured to a first higher layer configuration (RRC signaling) indicating the CC index of the second CC. In some embodiments, the UE can determine the activated or indicated beam state from a beam state list configured by a second higher layer configuration. The second higher layer configuration may also be in accordance with the same configuration as the first higher layer configuration (e.g., RRC signaling). The beam state list may be applied for the second CC or a CC list including the second CC. In other words, the activated or indicated beam state may be associated with the second CC or a CC list including the second CC. Also, the beam state can be activated or indicated by a second command (e.g., (MAC-CE or DCI) from the beam state list.

In some embodiments, the UE can determine a first information of a signal in a first CC according to a first reference RS in the first CC associated with a second reference RS in a second CC in an activated or indicated beam state.

Figure 4:
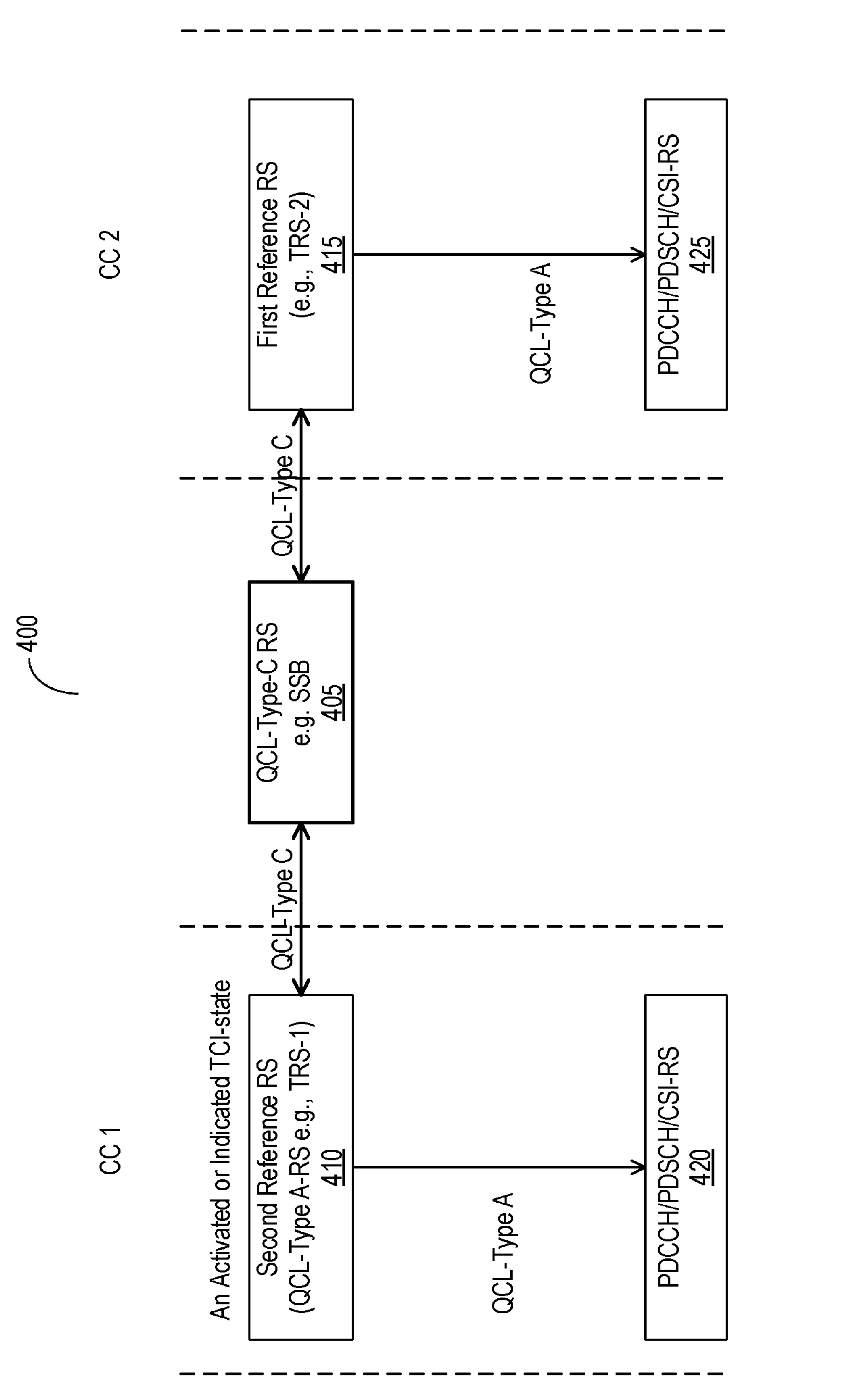
FIG. 4 illustrates a functional band diagram of an example method of using reference signals to determine information for target signals in associated component carriers.

Referring now to FIG. 4, illustrated is a functional band diagram of a method 400 of using reference signals to determine information for target signals in associated component carriers. The second reference RS may be configured with a third reference RS (e.g., QCL-Type C-RS) (405). The third reference signal may be a QCL-Type C-RS for the first reference RS. In other words, the QCL-Type C-RS for the second reference RS may be the same as the QCL-Type C-RS for the first reference RS.

As shown, the second CC may be CC1 and the first CC may be CC2. Both CC1 and CC2 may belong to a same CC list. The second reference RS in an activated or indicated TCI-state may be a QCL-Type A-RS (410). The QCL-Type A-RS may be a tracking reference signal (TRS) in CC1, e.g., TRS-1. TRS may be a CSI-RS resource in a NZP-CSI-RS-ResourceSet configured with higher layer parameter trs-Info. The configured QCL-Type C-RS for TRS-1 may be a SSB, which may be a QCL-Type C-RS for the first reference RS (e.g., TRS-2) in CC2. Therefore, the UE can determine TRS-2 according to TRS-1 (415), and then determine the QCL-Type A of PDCCH/PDSCH/CSI-RS in CC2 according to TRS-2 (420 and 425).

Figure 5:
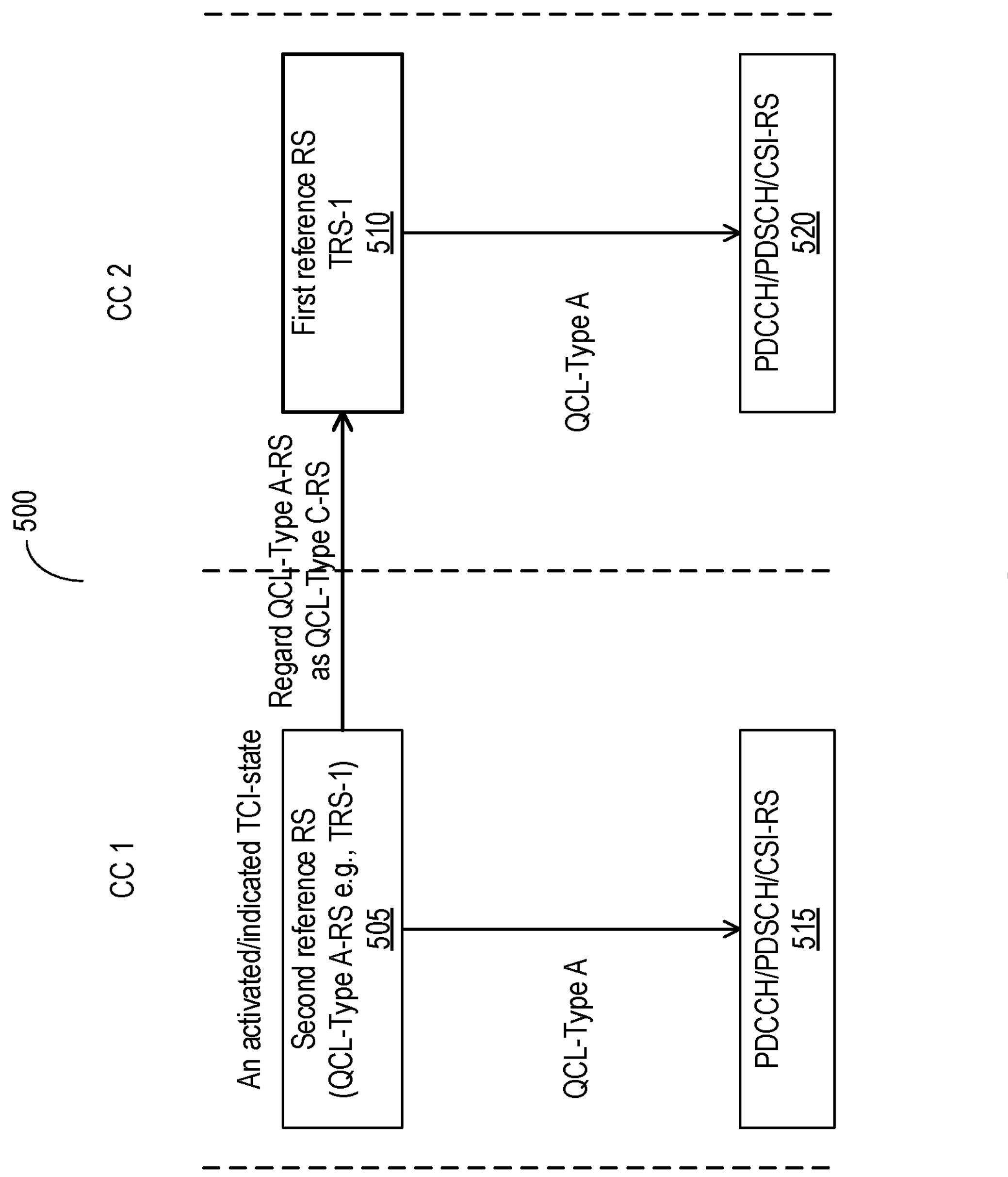
FIG. 5 illustrates a functional band diagram of an example method of interpreting reference signals of one type as another to determine information for target signals.

Referring now to FIG. 5, illustrated is a functional band diagram of a method 500 of interpreting reference signals of one type as another to determine information for target signals. In some embodiments, the UE can regard (or interpret, understand) a first QCL Type as a second QCL Type (505 to 510). For example, the UE can regard a QCL Type-A as a QCL Type-C. In other words, the UE can regard QCL Type-A RS as QCL Type-C RS. The reason for this is that QCL-Type C-RS in a CC can be used in another CC, but QCL-Type A-RS cannot. As illustrated, both CC1 and CC2 belong a same CC list. The second reference RS in an activated or indicated TCI-state is a QCL-Type A-RS. The second reference RS may be a TRS in CC1 (reference CC), e.g., TRS-1. For CC2, the UE can regard the QCL-Type A-RS as QCL-Type C-RS. So the QCL-Type A-RS (i.e., TRS-1) in CC1 can also be in CC2. The UE can determine the QCL-Type A for PDCCH/PDSCH/CSI-RS in CC2 according to TRS-1 (515 and 520).

Figure 6:
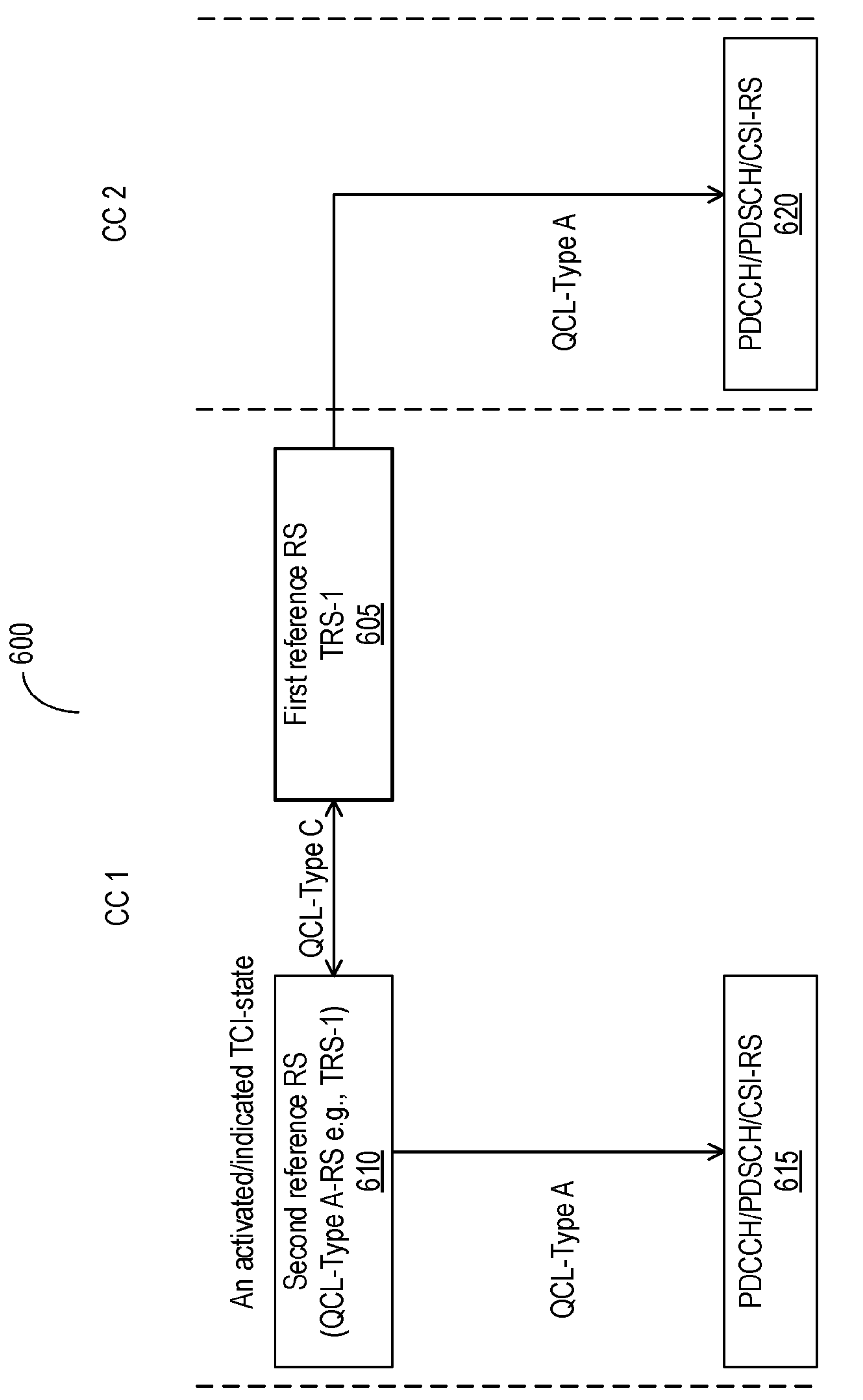
FIG. 6 illustrates a functional band diagram of an example method of using reference signals from one component carrier to determine information for target signals in another component carrier.

Referring now to FIG. 6, illustrated is a functional band diagram of a method 600 of using reference signals from one component carrier to determine information for target signals in another component carrier. In some embodiments, the first reference RS can be a QCL-Type C-RS for the second reference RS (605 to 610). As illustrated, both CC1 and CC2 may belong a same CC list. The second reference RS may be in an activated or indicated TCI-state is a QCL-Type A-RS. The QCL Type-A RS may be a TRS in CC1 (reference CC), e.g., TRS-1. A QCL-Type C-RS may be SSB-1. The UE can determine the QCL-Type A for PDCCH/PDSCH/CSI-RS in CC2 according to SSB-1 (615 and 620).

In some embodiments, the UE can determine a first information of a signal in a first CC according to a first reference RS associated with a second reference RS in a second CC in an activated or indicated beam state corresponding to a codepoint associated with the signal or a signal set including the signal. The codepoint may refer to a codepoint corresponding to a field in downlink control information (DCI) or PDCCH. For example, the TCI codepoint may correspond to TCI field, and each codepoint (e.g., '000', '001' or '101') may correspond to an activated/indicated TCI-state. In other words, there may be a predefined/indicated mapping between activated/indicated TCI state and codepoint.

In some embodiments, the activated or indicated beam state can be applied (to identify/indicate the beam to be used) for PDSCH. Further, the UE may be to transmit a PUCCH with HARQ-ACK information (used to indicate that the UE has received the activation command) in slot n (called as the first time slot) corresponding to the PDSCH carrying a activation command. At the time of transmission, the UE may be to determine the activated beam state corresponding to the codepoint from the first slot that is after slot k (called as the second time slot). The activation command is used to activate the activated/indicated beam state, where $$k = n + 3N_{slot}^{subframe,\mu}$$

where μ is the sub-carrier space (SCS) configuration for the PUCCH.

For example, both CC1 (the second CC and the first CC, because the first CC can be the same as the second CC) and CC2 (the first CC) may belong a same CC list. The UE may be configured with two CSI-RS resources in CC1 and CC2 respectively. For CC1, the two CSI-RS resources may include CSI-RS 1-1 and CSI-RS 1-2. For CC2, the two CSI-RS resources may include CSI-RS 2-1 and CSI-RS 2-2. Both CSI-RS 1-1 and CSI-RS 2-1 may be associated with TCI codepoint "000." Both CSI-RS 1-2 and CSI-RS 2-2 may be associated with TCI codepoint "001". Assume that the UE receives an activation command (e.g., MAC-CE signaling) activating two beam state (e.g., TCI-states, TCI-state 1 and TCI-state 2) applied for PDSCH in CC1 and (or) CC2, and the UE transmits a PUCCH with HARQ-ACK information in slot n corresponding to the PDSCH carrying the activation command. The two TCI-states then may be mapped to two codepoint: "000" and "001" from slot k (e.g., the first slot after 3 subframes) from the perspective of the UE. In other words, the UE can determine the first information (e.g., QCL-Type A, QCL-Type D) of CSI-RS 1-1 in CC1 and CSI-RS 2-1 in CC2 according to the first reference RS associated with a second reference RS in a second CC in an activated or indicated beam state.

In summary, the UE can determine a first information of a signal in a first CC or active BWP (also called as CC for short) according to a first reference RS associated with a second reference RS in a second CC in an activated/indicated beam state. The first CC may belong to a first CC list. The second CC may belong to a third CC list. The first CC list is the same as the second CC list. The first CC list may be associated with the second CC list.

The UE can determine the association between the first CC list and the second CC list according a first command. The information activated by the first command may include at least one of the following information: a beam state, a first CC list, a second CC list. The second CC may be a PCell (primary cell). A beam state list may be configured for the second CC. The beam state list may include the activated/indicated beam state. The second CC may be the CC that has the lowest CC index. The second CC may be the CC that has the highest CC index.

The UE can determine the second CC according to a first higher layer configuration. The UE can determine the activated or indicated beam state from a beam state list configured by a second higher layer configuration. The beam state list may be applied for the second CC or an CC list including the second CC. The UE can determine a first information of a signal in a first CC according to a first reference RS in the first CC associated with a second reference RS in a second CC in an activated/indicated beam state. The second reference RS may be configured with a QCL-Type C-RS, which is a QCL-Type C-RS for the first reference RS.

The UE can determine a first information of a signal in a first CC according to a first reference RS in the second CC associated with a second reference RS in a second CC in an activated or indicated beam state. The first reference RS can be the same as the second reference RS. The UE can regard a QCL-Type A-RS as a QCL-Type C-RS. The first reference RS can be a QCL-Type C-RS for the second reference RS.

The UE can determine a first information of a signal in a first CC according to a first reference RS associated with a second reference RS in a second CC in an activated or indicated beam state corresponding to a codepoint associated with the signal or a signal set including the signal. The activated/indicated beam state can be applied for PDSCH.

When the UE is to transmit a PUCCH with HARQ-ACK information (used to indicate that the UE has received the activation command) in slot n corresponding to the PDSCH carrying an activation command, the indicated mapping between the beam state (the activated or indicated beam state) and the codepoint should be applied starting from the first slot that is after slot k.

B. Associating CCs Using SRS Resource

The beam of PUSCH may be determined to reduce the signaling overhead caused by beam update of PUSCH, especially, for the PUSCH of a CC list. In some embodiments, the UE can determine a second information of a signal (e.g., PUSCH) in a first CC according to a SRS associated with a third reference RS in a second CC in an activated/indicated beam state, where the first CC belong to a first CC list, the second CC belonging to a second CC list. The second information may include one or more of the following: beam, power control parameter, and port indication, among others. The signal may include at least PUSCH.

The first reference RS may include one or more of the following RS: QCL-Type D-RS, spatial relation RS; specifically, QCL-Type D-RS is a SSB or CSI-RS, spatial relation RS is a SRS, SSB or CSI-RS. In addition, the first CC list and the second CC list meet at least one of the following relationship:

- the first CC list is the same as the second CC list;
- the first CC list is associated with the second CC list. In other words, there is a association between the first CC list and the second CC list.

The UE can determine the association between the first CC list and the second CC list according a second command. The information activated by the second command may include at least one of the following information: a beam state, a first CC list, a second CC list. For example, the second command can be a MAC-CE including a beam state ID, a UL CC list ID (can refer to the first CC list) and a DL CC list ID (can refer to the second CC list).

Furthermore, the second CC can satisfy at least one of the following feature, in other words, the UE can determine the second CC according to at least one of the following rules:

- The second CC is a PCell;
- A beam state list is configured for the second CC, where the beam state list comprises the activated/indicated beam state;
- The second CC is the CC that has the lowest CC index;
- The second CC is the CC that has the highest CC index.

The UE can determine the second CC according to a second higher layer configuration. Specifically, the UE can be provided or configured a second higher layer configuration (RRC signaling) indicating the CC index of the second CC. The UE can also determine the activated or indicated beam state from a beam state list configured by a second higher layer configuration. The beam state list may be applied for the second CC or an CC list including the second CC.

Figure 7:
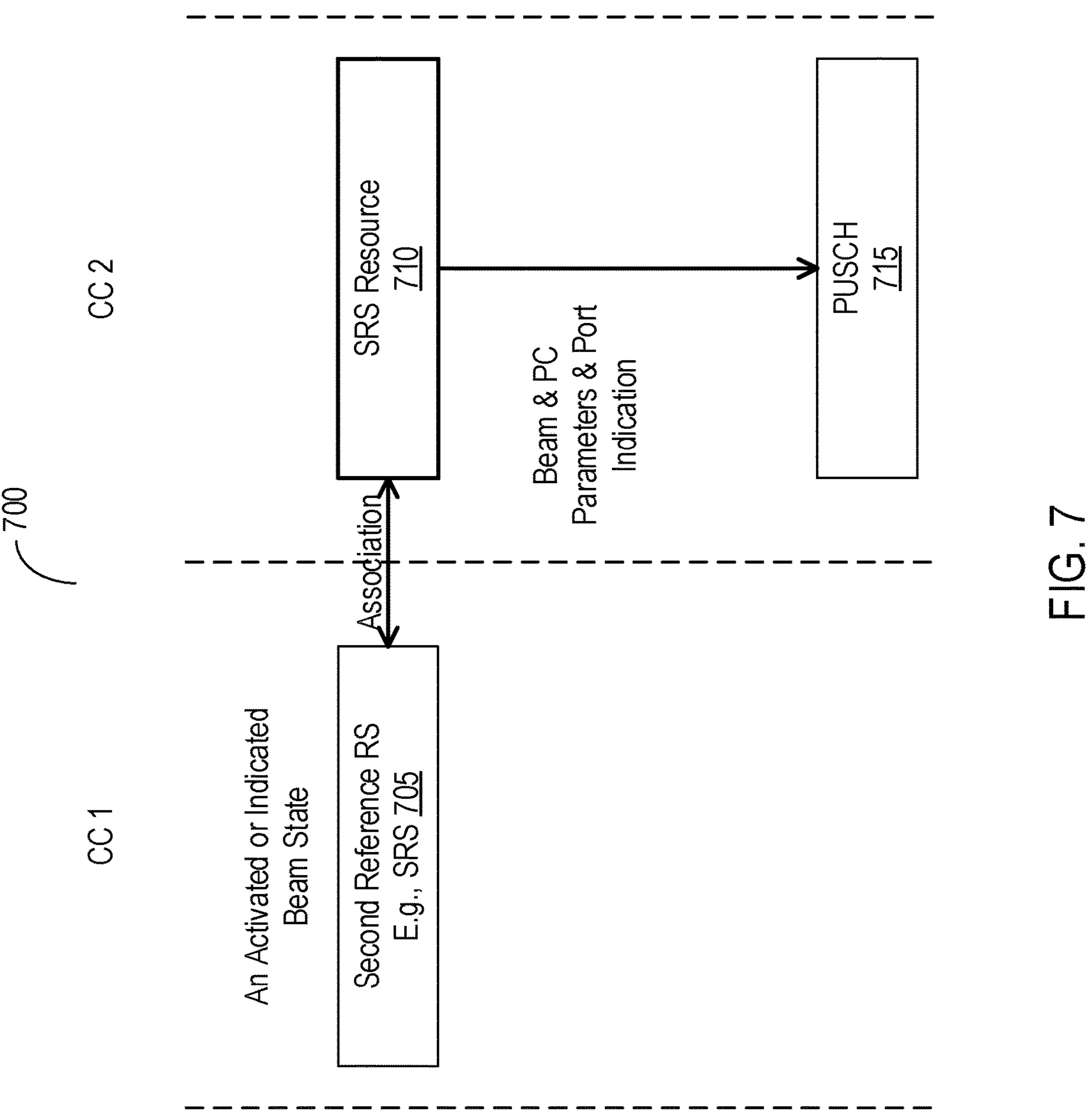
FIG. 7 illustrates a functional band diagram of an example method of determining information for target signals using sounding reference signals.

Referring now to FIG. 7, illustrated is a functional band diagram of a method 700 of determining information for target signal using sounding reference signals. As shown, the CC1 may be the second CC. In other words, the second CC can be called as a reference CC. CC1 may belong to a DL CC list, and CC2 may also belong to a UL CC list. The DL CC list may be associated with the UL CC list. The first reference RS (e.g., a SRS) in an activated/indicated beam state (e.g., TCI-state) may be configured in CC1 (705). The UE can determine the SRS in CC 2 according to the first reference RS based on the association between the SRS resource in CC 2 and the first reference RS (710). The UE can determine the beam, PC parameter, or port indication of PUSCH in CC2 according to the determined SRS in CC2 (715). For example, the UE can transmit PUSCH in CC 2 using the same antenna port(s) as the SRS port(s) in the determined SRS resource.

Figure 8:
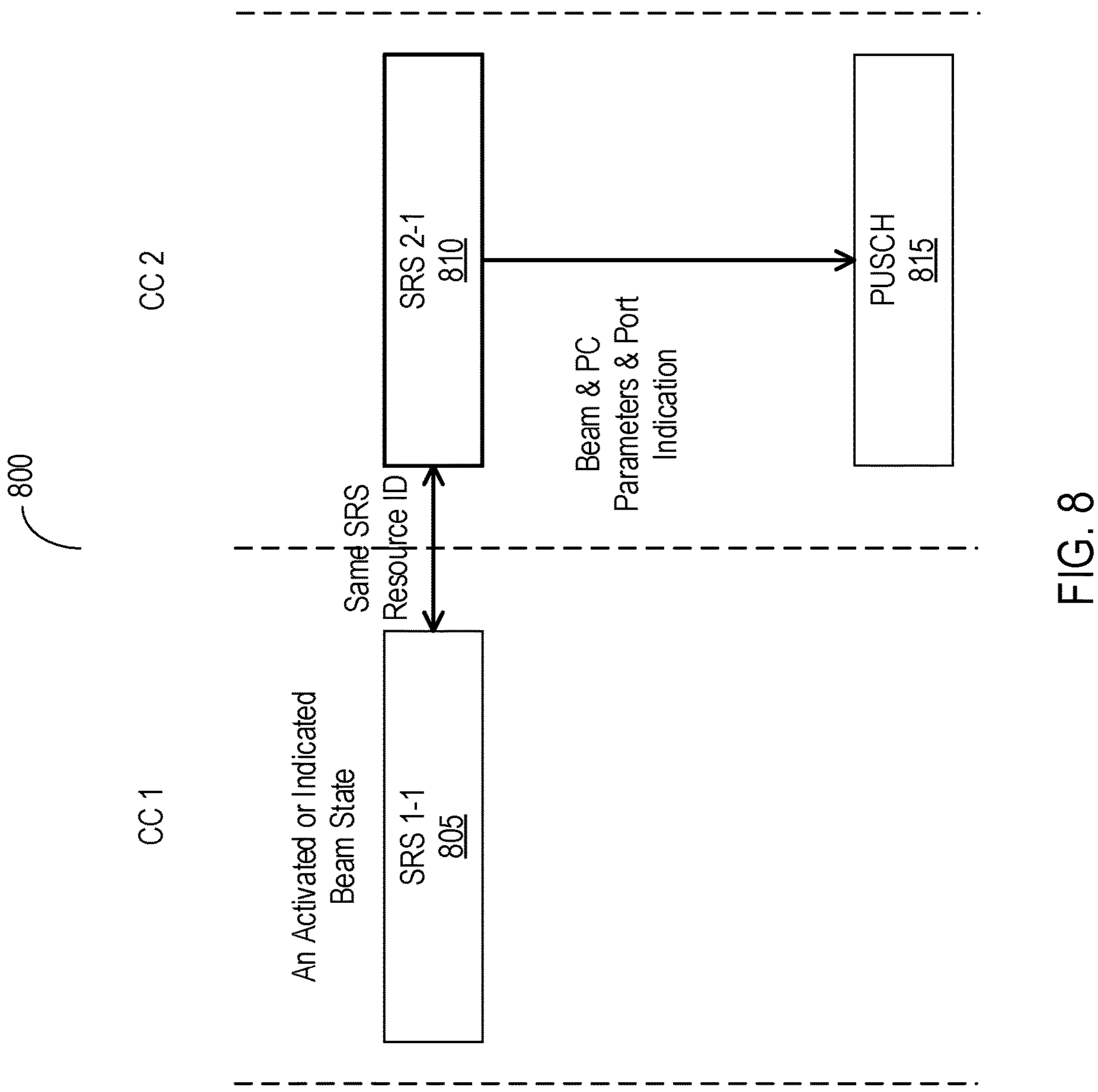
FIG. 8 illustrates a functional band diagram of an example method of using sounding reference signals with the same resource identifiers do determine information for target signals.

Referring now to FIG. 8, depicted is a functional band diagram of a method 800 of using sounding reference signals with the same resource identifiers do determine information for target signals. In some embodiments, the resource ID of the SRS may be the same as the resource ID of the first reference RS. The resource ID of the first reference RS (e.g., SRS) in CC1 may be 1 (e.g., SRS 1-1) (805). The UE can determine the SRS having SRS resource ID=1 in CC 2 according to the SRS 1-1 in CC 1 (e.g., SRS 2-1) (810). Then, the UE can determine the beam, PC parameter or port indication of PUSCH in CC2 according to SRS 2-1 (815). For example, the UE would transmit PUSCH in CC 2 using the same antenna ports as the SRS ports in SRS 2-1.

Figure 9:
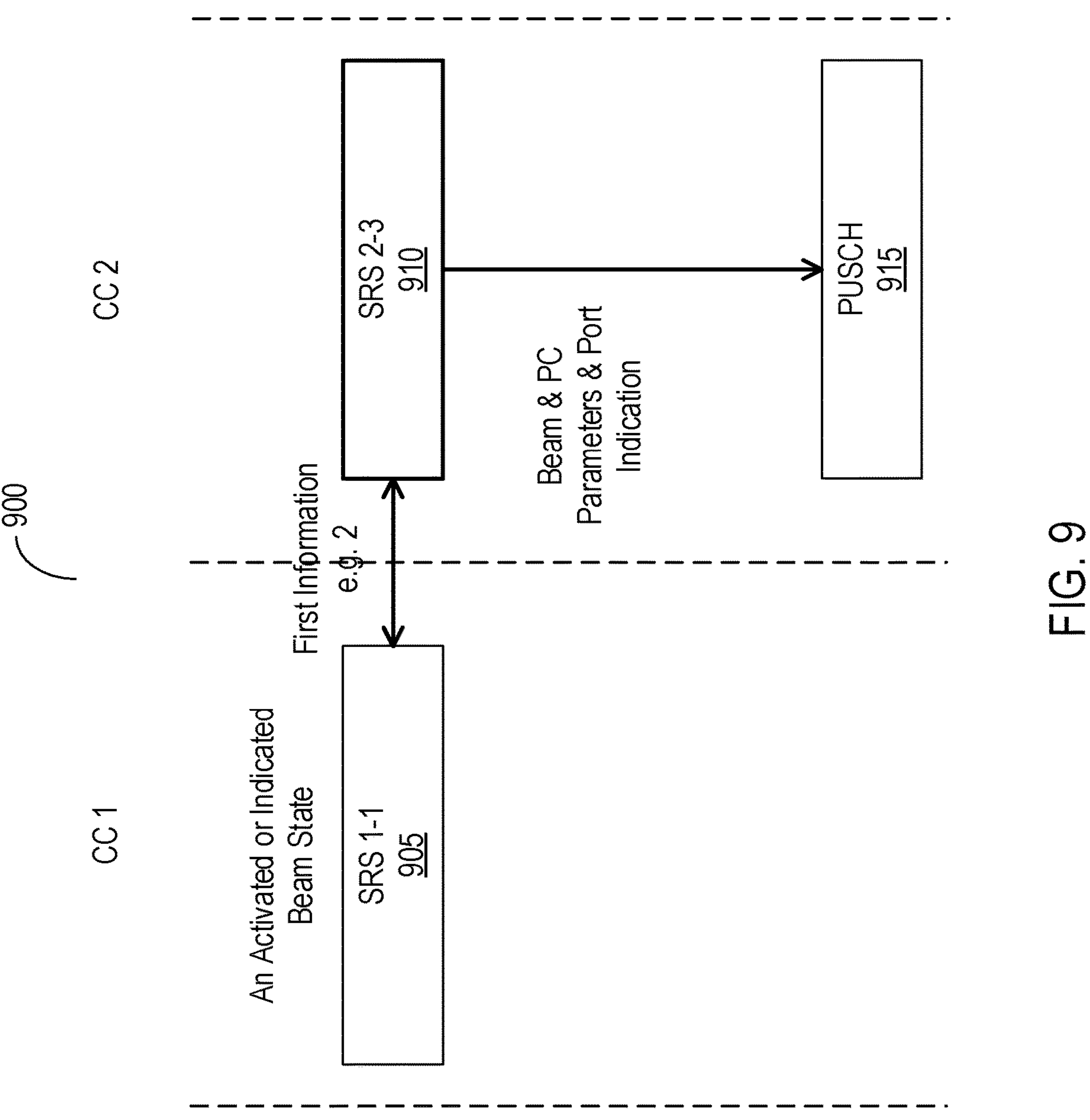
FIG. 9 illustrates a functional band diagram of an example method of using offset information to determine information for target signals.

Referring now to FIG. 9, illustrated is a functional band diagram of a method 900 of using offset information to determine information for target signals. In some embodiments, the UE can determine the SRS according to a first information The first information may identify or refer to a offset representing the difference between the resource ID of the SRS and the resource ID of the first reference RS. Specifically, the first information can be configured by a RRC signaling (i.e., a higher layer configuration) or activated by a MAC-CE signaling. For example, assume that the resource ID of the first reference RS (e.g., SRS) in CC1 is 1 (e.g., SRS 1-1) (905). The value of the first information may be 2 in this example. The UE can determine the SRS resource having SRS resource ID=1+2 in CC 2 according to the SRS 1-1 in CC 1 and the first information (e.g., SRS 2-3) (910). Then the UE can determine the beam, PC parameter, or port indication of PUSCH in CC2 according to SRS 2-3 (915). For example, the UE can transmit PUSCH in CC 2 using the same antenna ports as the SRS ports in SRS 2-3.

the UE can determine the SRS according to a first information, where the first information refers to a offset representing the difference between the resource ID of the SRS and the resource ID of the first reference RS. Specifically, the first information can be configured by a RRC signaling (i.e., a higher layer configuration) or activated by a MAC-CE signaling. For example, as shown in FIG. 7, assume that the resource ID of the first reference RS (e.g., SRS) in CC1 is 1, i.e., SRS 1-1. And the value of the first information is 2. The UE can determine the SRS resource having SRS resource ID=1+2 in CC 2 according to the SRS 1-1 in CC 1 and the first information, i.e., SRS 2-3. And then the UE can determine the beam, PC parameter or (and) port indication of PUSCH in CC2 according to SRS 2-3. E.g., the UE would transmit PUSCH in CC 2 using the same antenna port(s) as the SRS port(s) in SRS 2-3.

In summary, the UE can determine a second information of a signal in the first CC according to a SRS resource associated with a first reference RS in a second CC in an activated/indicated beam state. The first CC may belong to a first CC list. The second CC may belong to a second CC list. The first CC list may be the same as the second CC list. The first CC list is associated with the second CC list.

The UE can determine the association between the first CC list and the second CC list according a second command. The information activated by the second command may include at least one of the following information: a beam state, a first CC list, a second CC list. The second CC is a PCell. A beam state list may be configured for the second CC. The beam state list may include the activated or indicated beam state.

The second CC may be the CC that has the lowest CC index. The second CC may be the CC that has the highest CC index. The UE can be provided or configured a second higher layer configuration (RRC signaling) indicating the CC index of the second CC. The UE can determine the activated or indicated beam state from a beam state list configured by a second higher layer configuration. The beam state list may be applied for the second CC or an CC list including the second CC. The resource ID of the SRS resource may be the same as the resource ID of the first reference RS.

Figure 10:
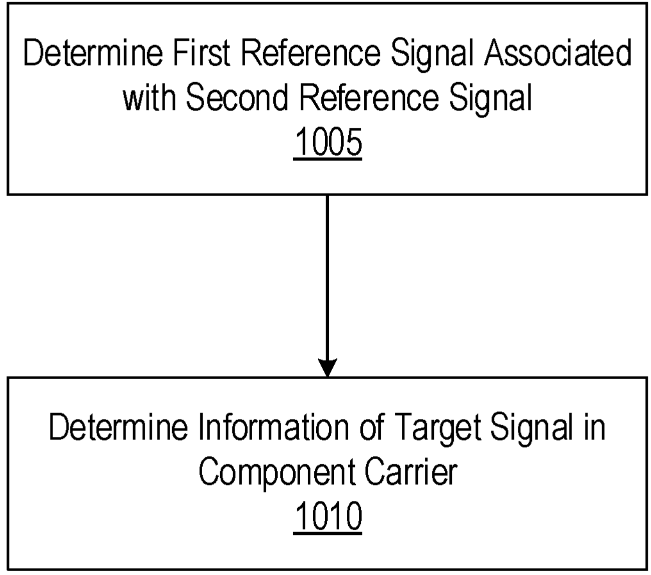
FIG. 10 illustrates a flow diagram of an example process of determining target signals based on component carrier associations.

The UE can determine then the SRS resource according to a first information, where the first information refers to a offset representing the difference between the resource ID of the SRS resource and the resource ID of the first reference RS C. Determining Target Signals Based on CC Association Referring now to FIG. 10, illustrated is a flow diagram of a process 1000 of determining target signals based on component carrier associations. The process 1000 may be implemented or performed by any of the components described herein in conjunction with FIGS. 1-9, such as the UE 104. In brief overview, a wireless communication device may determine a first reference signal associated with a second reference signal (1005). The wireless communication device may determine information of a target signal in a component carrier (1010).

In further detail, a wireless communication device (e.g., the UE 104) may identify or determine a first reference signal associated with a second reference signal (1005). In some embodiments, the first reference signal may include or a may be a quasi-co-location (QCL) reference signal of the second reference signal. The first reference signal may be associated with, may be part or, or otherwise may be in a first component carrier (e.g., CC2). The second reference signal may be associated with, may be part of, or otherwise may be in a second component carrier (e.g., CC1). Each CC may correspond to an aggregation of resources, such as an allocation of time (e.g., under time division duplexing (TDD)) or an allocation of frequency (e.g., under frequency-division duplexing (FDD)), among others. The reference signals may reside on a physical layer (PHY), and may be used to convey a reference point for DL or UL power. In some embodiments, the first CC and the second CC may belong to the same CC list. In some embodiments, the first CC and the second CC may belong to different CC lists. Each CC list may include a set of CC identified or determined as having similar characteristics. The determination of the first reference signal as associated with the second reference signal may be based on any number of factors.

In some embodiments, the wireless communication device may identify or determine whether the first CC list is associated with the second CC list based on or in response to receipt of a command. The command may include an identifier of a beam state, an identifier of the first CC list, or an identifier of the second CC list, among others. The identifier of the beam state may correspond to, reference, or otherwise identify a quasi-co-location (QCL) state, a QCL assumption, a transmission configuration indication (TCI) state, or a spatial relation information, among others. The QCL state or the TCI state may include reference signals (RSs) (e.g., QCL RSs) and the corresponding QCL type parameters. The QCL type parameters can in turn include at least one of the following aspects alone or in combination: Doppler spread, Doppler shift, delay spread, average delay, average gain, and spatial relation parameter. The spatial relation information may include one or more reference RSs (also called spatial RSs) which is used to represent the same or quasi co-located spatial relation between targeted RS or channel and the one or more RSs. The identifier of the first CC list may correspond to, reference, or otherwise identify the first CC list to which the associate. The identifier of the second CC list may correspond to, reference, or otherwise identify the second CC list to which to associate. Based on the specification of the command, the wireless communication device may determine the first CC list associated with the second CC list.

In some embodiments, the wireless communication device may identify or determine the second CC based on at least one rule. The rule may specify a relation or association between CCs. The rule may define, specify, or include:

- the second CC is a primary cell (PCell),
- the second CC has a highest CC index,
- the second CC has a lowest CC index,
- the second CC has a configured beam state list that includes the beam state (e.g., the activated beam state), or
- the second CC has an associated second CC index included in a received first higher layer configuration or is otherwise provided by the higher layer configuration.

In accordance with the rule, the wireless communication device may identify the second CC is a primary cell, a CC index of the second CC, a beam state of the second CC, and a higher layer configuration (e.g., RCC signaling on different levels). In some embodiments, the wireless communication device may compare the identifications with regards to the second CC with the rule. Based on the comparison, the wireless communication device may determine the second CC in which the second reference signal is in.

In some embodiments, the wireless communication device may identify or determine a beam state list associated with the second CC or a CC list that includes the second CC based on a receipt of a second higher layer configuration. The second higher layer configuration may correspond to an RCC signaling on different levels. The beam state list may define, specify, or identify a beam state of the CC, such as an activated beam state, an indicated beam state, or unactivated beam state, among others. In some embodiments, the wireless communication device may find, identify, or determine the activated beam state for the second CC or the CC list that includes the second CC based on the beam list.

In some embodiments, the wireless communication device may identify or otherwise determine whether the beam state is applicable to the target signal based on the first command. The target signal may be in the first CC or a CC list that includes the first CC list. The command may include an identifier of a beam state, an identifier of the first CC list, or an identifier of the second CC list, among others. In some embodiments, the wireless communication device (e.g., a UE) may be identified, defined, or provided by a higher layer configuration with a beam state list. In some embodiments, the wireless communication device may receive or may be provided with the beam state list from the higher layer configuration. The wireless communication device may retrieve, identify, or otherwise determine the beam state for the target signal from the beam state list in accordance with a second command. The command may include an identifier of a beam state, an identifier of the first CC list, or an identifier of the second CC list, among others. The In some embodiments, the wireless communication device may identify or determine a third reference signal (e.g., QCL-Type-C RS) based on the second reference signal. In some embodiments, the wireless communication device may associate the third reference signal with the second reference signal. The third reference signal may be of a different QCL type from the second reference signal. The second reference signal may be associated with the third reference signal with regards to the QCL. In some embodiments, the third reference signal may include or may be a quasi-co-location (QCL) reference signal of the second reference signal. In some embodiments, the wireless communication device may identify or determine the first reference signal based on the third reference signal. In some embodiments, the wireless communication device may associate the third reference signal with the first reference signal. The third reference signal may be of the different QCL-type from the first reference signal. The first reference signal may be associated with the third reference signal with regards to the QCL. The first reference signal and the second reference signal may be associated with each other with regards to the QCL. Based on the QCL types, the wireless communication device may identify or determine the reference signals. In some embodiments, the third reference signal may include or may be a QCL reference signal of the first reference signal. In some embodiments, the wireless communication device may use, configure, or utilize a first QCL type (e.g., QCL-type A or type-B) as a second QCL type (e.g., QCL-type A or type-B). The first QCL type may be different from the second QCL type.

In some embodiments, the wireless communication device may generate, identify, or determine a resource identifier (ID) for the first reference signal. The resource ID for the first reference signal may uniquely reference or identify the first reference signal. The determination of the resource ID for the first reference signal may be based on a source ID for the second reference signal or an offset. The offset may identify, indicate, or otherwise refer to a difference between the resource ID for the first reference signal and the resource ID for the second reference signal. The resource ID for the second reference signal may uniquely reference or identify the second reference signal. In some embodiments, the wireless communication device may find, identify, or determine the first resource signal based on the resource ID for the first resource signal.

In some embodiments, the wireless communication device may calculate, generate, or otherwise determine a codepoint associated with the second reference signal or a signal set that includes the second reference signal. In some embodiments, the wireless communication device may correlate, correspond, or otherwise associate the codepoint with the second reference signal or the set that includes the second reference signal. The codepoint may be determine in accordance with a TCI codepoint, and may identify or correspond to a beam state (e.g., activated or inactivated) applicable to a DL signal. In some embodiments, the wireless communication device may identify or determine the beam state (e.g., the activated beam state) corresponding to the codepoint. The beam state may be associated with the second reference signal or the signal set that includes the second reference signal. In some embodiments, the wireless communication device may correspond, associate, or map the beam state to the codepoint. In some embodiments, the activated beam state may be applicated to a physical downlink shared channel (PDSCH) or a physical downlink control channel (PDCCH).

In some embodiments, the wireless communication device may calculate, identify, or otherwise determine a first time slot based at least on a PUCCH transmission. The PUCCH transmission may carry HARQ-ACK information corresponding to PDSCH. The PDSCH may carry an activation command that activates the activated beam state or a set of beam states including the activated beam state. The activated beam state may be associated with the second reference signal. The PUCCH transmission may be transmitted as part of a HARQ protocol. In some embodiments, the wireless communication device may calculate, identify, or otherwise determine a second time slot based on the first time slot and a sub-carrier spacing configuration for the PUCCH. The sub-carrier spacing may correspond to a time duration of the PUCCH transmission. In some embodiments, the wireless communication device may calculate, identify, or otherwise determine the activated beam state corresponding to a codepoint from a time slot subsequent to the second time slot. The code point for the subsequent time slot may be determine in the manner discussed above. The activated beam state may be associated with the second reference signal.

The wireless communication device may identify, generate, or determine information of a target signal in the first component carrier (e.g., CC1) (1010). The determination of the information of the target signal may be in accordance with the first reference signal. In some embodiments, the information of the target signal may identify, define, or otherwise include a beam, a power control parameter, or a port indication, among others. The beam may define or identify the beam for the target signal. The power control parameter may define or identify path-loss RS, closed loop process, and P0, among others. The port indication may reference or identify an antenna port through which to transmit the target signal. In some embodiments, the target signal may include a physical downlink control channel (PDCCH), a physical downlink shared channel (PDSCH), a channel state information reference signal (CSI-RS), a physical uplink control channel (PUCCH), a physical uplink shared channel (PUSCH), or a sounding reference signal (SRS), among others.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method, comprising:

receiving, by a wireless communication device, a beam state list comprising a beam state of a target signal in a first component carrier (CC), via a first radio resource control (RRC) signaling in a second CC;

determining, by the wireless communication device, the second CC as a reference CC according to a second RRC signaling which indicates an index of the second CC;

determining, by the wireless communication device, a first reference signal in the first CC based on a reference signal (RS) identifier in the beam state of the beam state list that is configured in the second CC;

determining, by the wireless communication device, first information of the target signal in the first CC according to the first reference signal;

receiving, by the wireless communication device, a first command comprising an identifier of the beam state activated or indicated from the beam state list;

determining, by the wireless communication device, based on the first command, that the beam state is applicable to the target signal in the first CC; and communicating, by the wireless communication device, the target signal in the first CC using the beam state.

2. The method of claim 1, further comprising:

determining, by the wireless communication device, that the beam state is applicable to the target signal in a CC list including the first CC.

3. The method of claim 1, wherein the first information includes a beam.

4. The method of claim 1, wherein the target signal includes at least one of a physical downlink control channel (PDCCH), a physical downlink shared channel (PDSCH), a channel state information reference signal (CSI-RS), a physical uplink control channel (PUCCH), a physical uplink shared channel (PUSCH), or a sounding reference signal (SRS).

5. A wireless communication device, comprising:

at least one processor configured to:

receive, via a receiver, a beam state list comprising a beam state of a target signal in a first component carrier (CC), via a first radio resource control (RRC) signaling in a second CC;

determine the second CC as a reference CC according to a second RRC signaling which indicates an index of the second CC;

determine a first reference signal in the first CC based on a reference signal (RS) identifier in the beam state of the beam state list that is configured in the second CC;

determine first information of the target signal in the first CC according to the first reference signal;

receive a first command comprising an identifier of the beam state activated or indicated from the beam state list;

determine, based on the first command, that the beam state is applicable to the target signal in the first CC; and communicate the target signal in the first CC using the beam state.

6. The wireless communication device of claim 5, wherein the at least one processor is configured to:

determine that the beam state is applicable to the target signal in a CC list including the first CC.

7. The wireless communication device of claim 5, wherein the first information includes a beam.

8. The wireless communication device of claim 5, wherein the target signal includes at least one of a physical downlink control channel (PDCCH), a physical downlink shared channel (PDSCH), a channel state information reference signal (CSI-RS), a physical uplink control channel (PUCCH), a physical uplink shared channel (PUSCH), or a sounding reference signal (SRS).

* * * * *